March 21, 1967  U. G. AUGER  3,310,797
METHOD AND APPARATUS FOR COORDINATING RESTAURANT OPERATION
Filed July 1, 1963  9 Sheets-Sheet 1

Fig.1

INVENTOR
ULYSSES G. AUGER

BY Shoemaker and Mattare

ATTORNEYS

March 21, 1967   U. G. AUGER   3,310,797
METHOD AND APPARATUS FOR COORDINATING RESTAURANT OPERATION
Filed July 1, 1963   9 Sheets-Sheet 3

Fig.3

INVENTOR
ULYSSES G. AUGER

BY Shoemaker and Mattare

ATTORNEYS

March 21, 1967 U. G. AUGER 3,310,797
METHOD AND APPARATUS FOR COORDINATING RESTAURANT OPERATION
Filed July 1, 1963 9 Sheets-Sheet 4

FIG. 4

INVENTOR
ULYSSES G. AUGER

BY Shoemaker and Mattire

ATTORNEYS

March 21, 1967 U. G. AUGER 3,310,797
METHOD AND APPARATUS FOR COORDINATING RESTAURANT OPERATION
Filed July 1, 1963 9 Sheets-Sheet 5

Fig.5

INVENTOR
ULYSSES G. AUGER

BY *Shoemaker and Mattare*

ATTORNEYS

March 21, 1967  U. G. AUGER  3,310,797
METHOD AND APPARATUS FOR COORDINATING RESTAURANT OPERATION
Filed July 1, 1963  9 Sheets-Sheet 6

Fig. 9

INVENTOR
ULYSSES G. AUGER

BY *Shoemaker and Mattare*

ATTORNEYS

March 21, 1967     U. G. AUGER     3,310,797
METHOD AND APPARATUS FOR COORDINATING RESTAURANT OPERATION
Filed July 1, 1963     9 Sheets-Sheet 8

FIG. 8

INVENTOR
ULYSSES G. AUGER

BY *Shoemaker and Mattare*

ATTORNEYS

United States Patent Office 3,310,797
Patented Mar. 21, 1967

3,310,797
METHOD AND APPARATUS FOR COORDINATING RESTAURANT OPERATION
Ulysses G. Auger, 1217 22nd St. NW., Washington, D.C. 20037
Filed July 1, 1963, Ser. No. 291,694
16 Claims. (Cl. 340—286)

The present invention relates to new and novel method and apparatus for coordinating restaurant operation, and more particularly to an arrangement which ensures maximum efficiency in seating of patrons and which speeds up service in the restaurant.

The present invention may be employed in various applications, but is particularly designed for use in restaurant operations, and especially in rather large restaurant installations, wherein the restaurant may be composed of an entrance area and a plurality of widely spaced dining areas remote from the entrance area, thereby creating a major problem in obtaining efficient seating of the patrons.

The trend in the restaurant business in recent years has been toward installations wherein the restaurant rather than comprising a single large room with many tables therein, is on the contrary commonly divided into a number of different dining areas of different decor and providing variations in atmosphere, thereby affording greater enjoyment and attractiveness to the patron. As a result, it is a common situation in restaurant installations of the modern day to have an entrance area which is quite remote from one or more of the various separate dining areas, and in many instances, some of the dining areas may be completely hidden from the entrance area such that the maître d' is faced with an extremely difficult task in attempting to properly channel the flow of patrons to the various dining areas and to keep the tables occupied as they become vacant.

In relatively large scale restaurant operations, it is essential to obtain a relatively high turnover of patrons in order to make this type of operation economically feasible. It accordingly becomes essential to direct the patrons as quickly as possible to the tables as they are being cleared and are unoccupied. Since the maître d' is not in a position to observe the various tables in the many rooms from his position in the entrance area, and further since it is completely impractical for him to attempt to travel continuously from room to room to apprise himself of the status or condition of the various tables, it becomes necessary to provide some means for apprising the maître d' of the condition of the tables throughout the restaurant without the necessity of his leaving his post in the entrance area.

The present invention provides a means which gives an instant visual indication of the condition of the tables throughout the entire restaurant, this means taking the form of the master station unit which can be positioned in the lobby or entrance area of the restaurant and which is sufficiently compact such that it may be readily installed without occupying an excessive amount of space.

This master control station unit provides a considerable amount of information. Firstly, the unit is provided with a master control portion upon which are mounted suitable indicating means such as lights, the lights being positioned on the master control portion in such a position as to indicate the layout of the various rooms and the relative positions of the tables in each room. With this arrangement, the maître d' can determine at a glance the occupancy of the tables in the various rooms, and he can determine exactly which tables at what locations are available.

Additionally, the indicating means at the master unit is such that it indicates whether the table is presently occupied, is presently vacant, or whether it is in the process of being cleared. This information is, of course, quite important since patrons may be sent back to an individual dining area upon receiving the information that a particular table is being cleared, since in all proability the table will either be cleared by the time the patrons arrive in the dining area, or will be available immediately after they have arrived at such dining area. This is of great importance since it enables the maître d' to direct patrons to the various dining areas while the tables are being cleared such that the patrons can then stay in the particular dining areas on a stand-by basis if the tables are not completely cleared. This arrangement permitting a more or less steady continuous flow of patrons from the entrance area.

Acordingly, a traffic jam is prevented in the entrance area and it is not necessary to provide a large lobby where patrons are required to stand or sit while waiting for tables. This is, of course an economic factor also, since a large amount of area for this purpose is not required.

Another feature of the present invention is the provision of a unit similar to the master unit which may be connected in parallel therewith and disposed for example in the owner's office, such that the owner of the restaurant may be apprised at all times of the activity in the restaurant, and he can visually observe the manner in which the table occupancy is changing and the amount of time required for such changes. This, of course, gives the owner a very good over-all picture of the entire restaurant operation without necessitating his leaving the office.

The present invention in fact provides a communication system between the master unit in the entrance area of the restaurant and the remote units in each of the dining areas of the restaurant. This communication system involves visual and sound means of communication, and permits information to be transmitted back and forth between the units and further allows various signals to be transmitted as required to convey certain information or to page certain individuals.

With this type of remote communication system throughout the restaurant, the movement of the maître d' as well as the captain in each of the dining areas is reduced to a minimum, thereby allowing the personnel to concentrate on their duties in their own particular areas without the necessity of walking back and forth from one area to another. The maître d' as well as the captain of each of the dining areas can tell at a glance at the indicating means of the units the condition of the tables in the respective dining areas, and if any communication is required between the areas, the system of the present invention may be employed.

In order to produce the maximum efficiency, the system of the present invention not only incorporates the visual and sound means of communication as aforedescribed between the various areas, but further communication media such as telephones or the like may also be provided at the master and remote units so as to provide a grouping of the various communication instrumentalities in a most compact and efficient manner. Accordingly, most of the activities required by the maître d' or the room captain for a certain dining area can be carried out at one spot, and reservations may be taken over the telephone, for example, and any necessary information may be passed back and forth between the various areas.

Since the apparatus of the present invention is to be utilized in full view of the patrons in the restaurant, it is an essential feature of the invention to provide apparatus which is neat and attractive in appearance, and which does not detract from the decor or atmosphere of the rooms. The units of the present invention have been designed with this in mind and provide attractive arrangements which are in fact a conversation piece and which have proved to be interesting and fascinating to watch in action.

It is also important that the apparatus of the present invention be simple and easy to use since the personnel utilizing this apparatus generally will have no technical training. Accordingly, the structure of the present invention is not complicated and is conveniently operable with no training or special knowledge necessary on the part of personnel, operation of the apparatus being easily mastered and substantially fool-proof in operation.

It will be understood that the dining areas as referred to in this specification may be of any design, and may comprise either interior rooms or outdoor areas as the case may be, and of course, the dining areas may be arranged on more than one floor. The dining areas furthermore may be widely separated from one another and need not necessarily be interconnecting. The arrangement of the present invention may be custom designed for any particular restaurant and can easily be modified to provide the desired information for any particular restaurant layout.

The remote station units employed in each of the dining areas are conveniently located in the dining area so as to be readily accessible and to afford the captain of the particular dining area a good view of the entire room. The master station unit of the present invention is particularly designed so as to be of an expandable nature whereby it may be initially installed in a restaurant, and as more rooms are added, the master control portion of the master unit may be expanded to include additional panels for each additional room which is added. With this arrangement, maximum versatility of the apparatus is provided, the electrical network of the present invention being of such a nature as to readily permit additions thereto without any major modifications.

An object of the present invention is to provide new and novel method and apparatus for coordinating restaurant operation which provides maximum efficiency of seating, speed-up of service, and ensures that a maximum number of tables will be occupied at all times.

Another object of the invention is to provide new and novel apparatus for coordinating restaurant operation which provides an instant visual indication of the condition, size and location of each table in the entire restaurant, this visual indication being provided both at a master unit and also in an auxiliary unit in the owner's office or the like, where desired.

A further object of the invention is the provision of new and novel method and apparatus for coordinating restaurant operation which prevents an excessive number of patrons from accumulating in the entrance area of the restaurant, thereby enabling a relatively small lobby or entrance area to be successively utilized, and permitting rapid dispersal of patrons from such entrance area.

Still another object of the invention is to provide a complete communication system between the various dining areas and the entrance area of a restaurant and affording means for signalling between such areas and giving certain information important to proper restaurant operation.

A still further object of the invention is the provision of new and novel method and apparatus for coordinating restaurant operation which reduces the movement required by the maître d' and the dining area captains to a minimum, thereby enabling the personnel to operate at maximum efficiency.

Yet another object of the invention is to provide new and novel apparatus for coordinating restaurant operation which is quite neat and attractive in appearance and yet which is relatively simple and easy to use.

Still a further object of the invention is the provision of apparatus for coordinating restaurant operation which is relatively simple and inexpensive in construction, and yet which is efficient and reliable in use.

Still another object of the invention is to provide a new and novel method for coordinating restaurant operation which produces maximum efficiency and yet which can be readily carried out even by relatively inexperienced personnel with little training.

Other objects and many attendant advantages of the invention will become more apparent when considered in connection with the specification and accompanying drawings, wherein.

Figure 1:
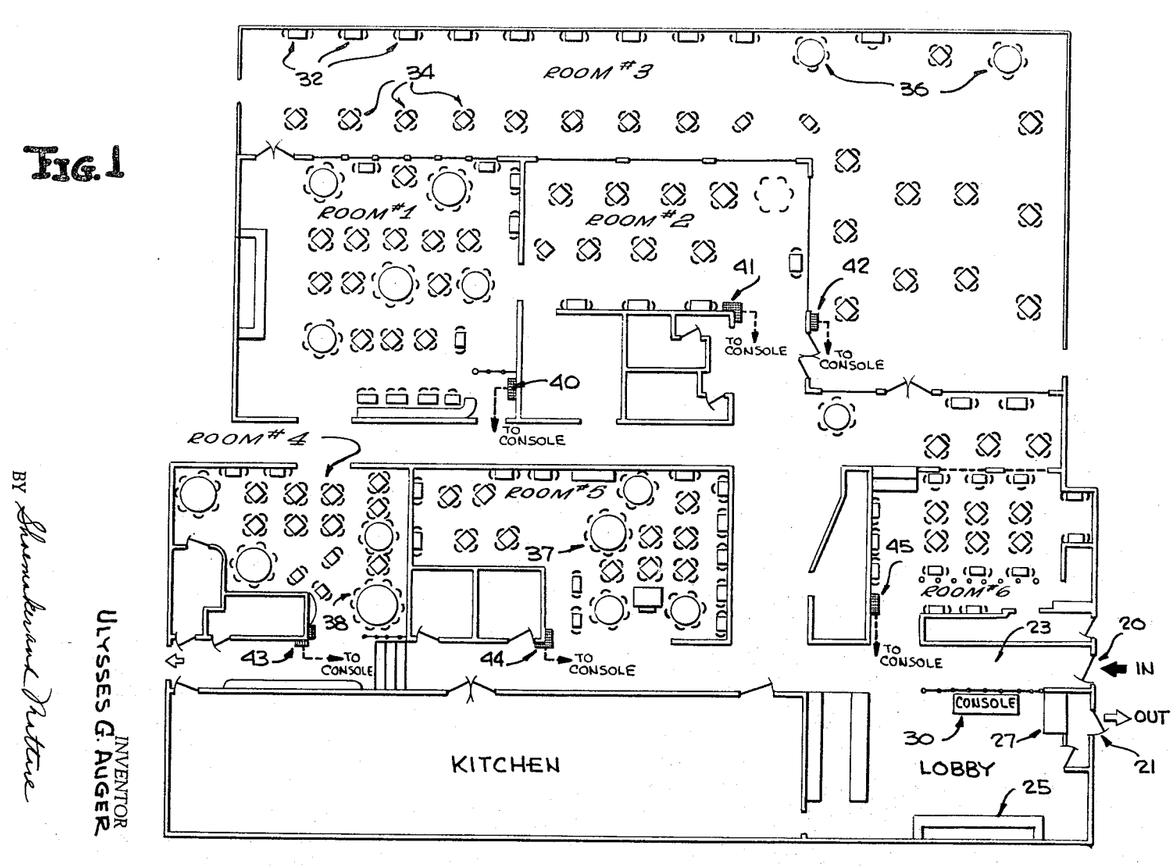
FIG. 1 is a top plan view illustrating the layout of a typical restaurant illustrating the location of the tables in the different dining areas as well as the position of the master station unit and the various remote station units positioned in each of the dining areas.

Referring now to the drawings wherein like reference characters designate corresponding parts throughout the several views, there is shown in FIG. 1 a top plan layout view of a typical first floor arrangement of a restaurant incorporating the present invention. As seen in this view, an entrance door is indicated by reference numeral 20 and an exit door is indicated by reference numeral 21, the patrons entering through door 20 into a relatively narrow passageway 23 which in turn opens into the lobby as indicated, suitable seats being indicated schematically at 25 for the patrons to sit down while waiting, if necessary.

The cashier's station is indicated by reference numeral 27 convenient to the exit door of the restaurant, and the master station unit of the present invention is indicated by reference numeral 30 and identified with the legend "console" since this unit may take the form of a console as hereinafter described. It will be noted that the console is strategically positioned adjacent the narrow passageway 23 such that the entering patrons will pass before the console behind which the maître d' may be posted for directing and controlling the flow of patrons to the various dining areas throughout the restaurant.

The interior of the restaurant is shown as being divided into six separate dining areas identified on the drawings as Room #1, Room #2, Room #3, Room #4, Room #5 and Room #6. Still another room identified as Room #7 is not shown in this figure, but is located on the second floor above a portion of the structure illustrated on the first floor in FIG. 1.

As illustrated, each of the various rooms may be enclosed within the building, while Room #3 represents an outdoor eating area which may or may not be covered as desired. At any rate, it is clear from the restaurant illustrated that the various dining areas may be of different shapes and sizes, either indoors or outdoors as desired. It is further evident from an inspection of FIG. 1 that the major portions of all of the dining areas are either partially or completely hidden from view of the maître d' stationed behind the console in the entrance area of the restaurant, and it would be impossible for the maître d' to determine the availability of the tables in the different dining areas without the utilization of the present invention for all practical purposes.

In FIG. 1, the layout of the tables in the various rooms is indicated, and for example as seen in Room #3, a plurality of tables 32 are illustrated which are adapted to accommodate two patrons as indicated by the schematic illustration of two chairs at each of these tables. A plurality of tables 34 are adapted to accommodate four patrons as schematically indicated, and a pair of tables 36 are adapted to accommodate five patrons. The tables have been similarly schematically illustrated throughout the entire restaurant, it being noted that in different rooms, there may be provided tables of different sizes and shapes, and adapted to accommodate different numbers of patrons, it being noted for example that relatively large tables may be provided as for example table 37 in Room #5, which is adapted to accommodate eight patrons, and an even larger table in Room #4 indicated by reference numeral 38 and adapted to accommodate up to 10 patrons.

Each of the six dining areas indicated in FIG. 1 is provided with a remote station unit, ROOM #1, ROOM #2, ROOM #3, ROOM #4, ROOM #5, and ROOM #6 being provided respectively with the remote station units 40, 41, 42, 43, 44 and 45. In each instance, the remote station unit is disposed at a strategic position within the respective dining areas such that the captain for the particular dining area may remain at his post to meet patrons as they enter the particular dining area, and the captain may operate the control switches of the remote unit as well as observe the various signal lights, etc., from his customary station in the particular dining area.

Figure 2:
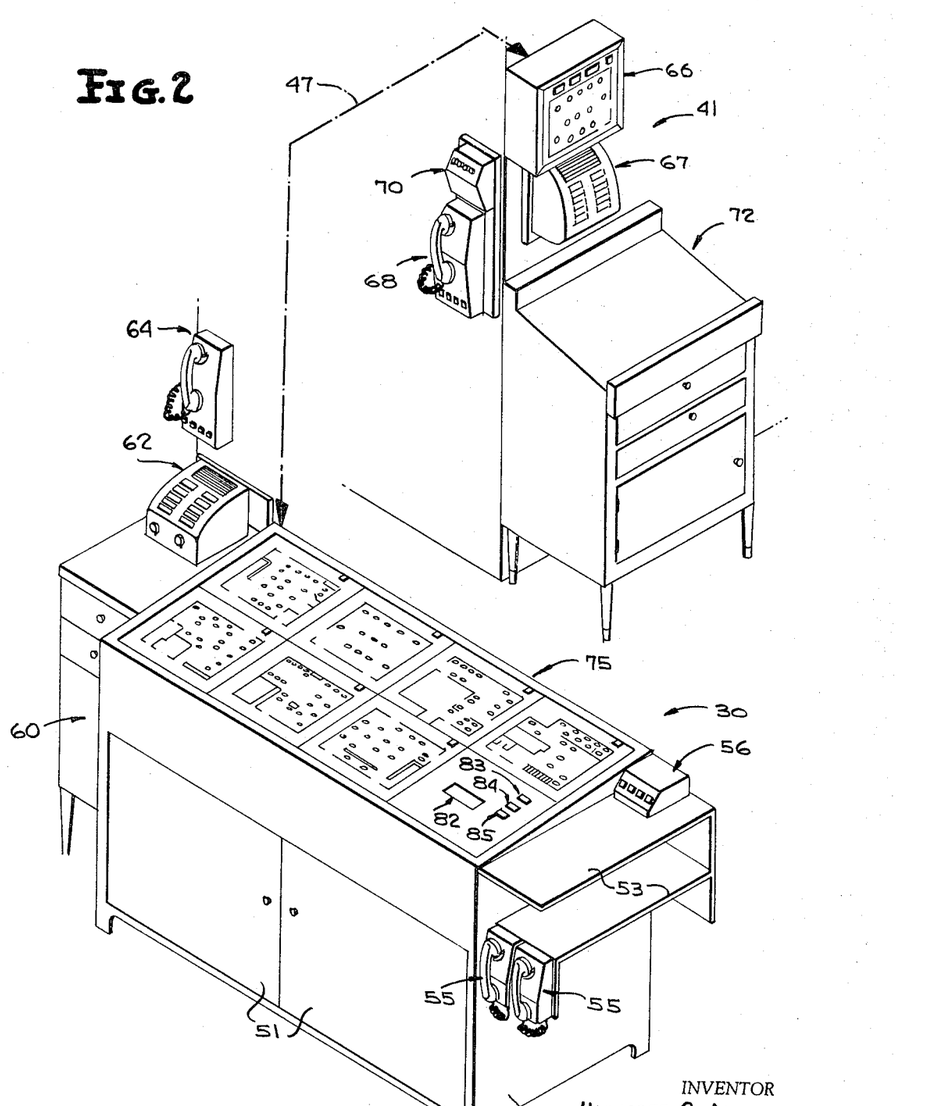
FIG. 2 is a top perspective view illustrating the master station unit and a typical remote station unit as employed in one of the dining areas of the restaurant.

Referring now to FIG. 2 of the drawings, a top perspective view of the master station unit 30 and the remote station unit 41 in ROOM #2 is illustrated dot-dash line 47 indicating schematically the electrical connection between the master unit and the remote unit, the electrical system being more completely described hereinafter.

The master unit console includes a body means 50 having a pair of doors 51 in the side thereof for gaining access to the interior of the body means whenever it is necessary to repair or replace certain components of the electrical system. A pair of shelves 53 are provided at one side of the body means, a pair of telephones 55 being supported from the lower shelf and a telephone control unit 56 being mounted on the upper shelf. An auxiliary support table 60 is disposed at the opposite end of the body means 50 and a master intercom station 62 is supported by table 60. A further telephone unit 64 is supported above the intercom unit 62 by any suitable support mechanism. It is apparent that the arrangement of the components at and adjacent to the console 30 is such as to provide a very compact and efficient station from which all of the various functions of the maitre d' may be carried out. The remote station unit 41 includes the body means 66, the details of which will be more fully described hereinafter.

A remote intercom unit 67 supported beneath the body means 66, and a telephone 68 and its control unit 70 is mounted on the wall adjacent means 66 and 67. A suitable table-desk combination 72 is supported on the floor adjacent the remote unit such that the captain of the particular dining area may conduct the major portion of his duties from this single location.

Figure 3:
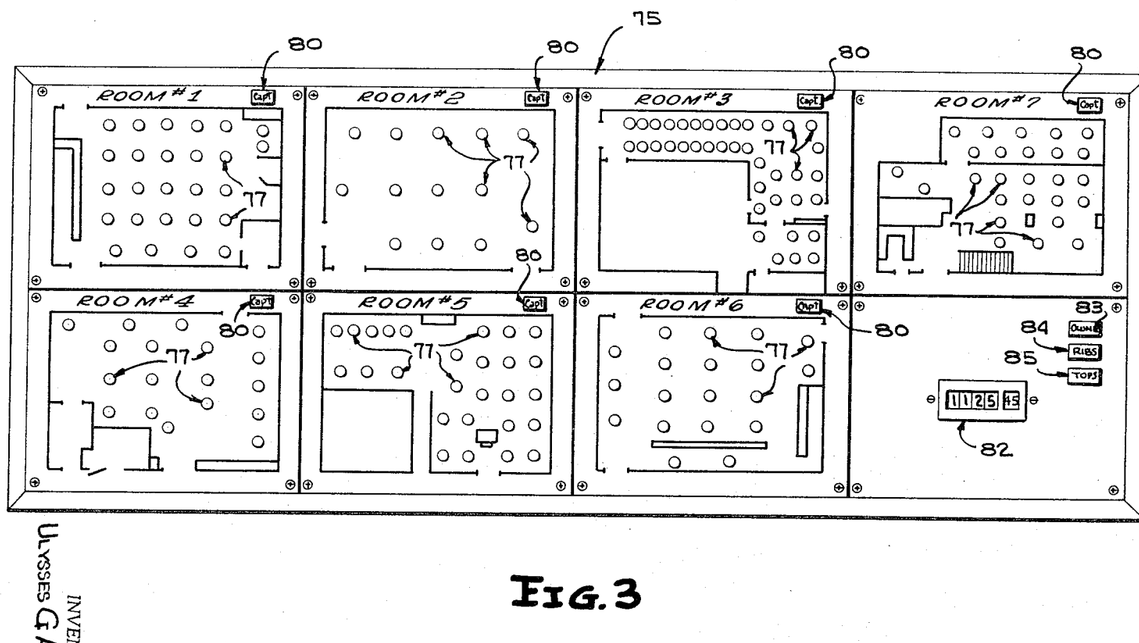
FIG. 3 is a top plan view of the master control portion of the master station unit illustrating the manner in which the indicator means are positioned on the master unit to indicate the positions of the tables in the various dining areas.

As seen in FIG. 2, the upper portion of the master unit comprises a master control portion 75 which faces upwardly and is on a slight incline such that a person standing directly behind the console can readily survey the entire control portion and obtain an immediate visual picture of the over-all condition of the tables throughout the entire restaurant. The master control portion is shown in more detail in FIG. 3, wherein it will be seen that the various dining areas are laid out in seven separate panels as seen in FIG. 3, an additional room identified as ROOM #7 being shown on the control portion although this room is on a different level and is not specifically illustrated in FIG. 1. It will be noted that each of the individual panels in FIG. 3 includes the general layout of the dining area and is so arranged as to indicate the actual shape of the dining area as well as the particular relative location of all of the tables within the dining area.

A plurality of lights 77 which serve as visual indicator means are provided in each of the panels of the control portion, it being noted that these lights are positioned in the same relative location within the dining area as laid out on the panel as the actual tables are positioned in the particular dining areas. In other words, each of the lights 77 in any particular dining area indicates the relative position of a table within that dining area, and these lights are further constructed and arranged so as to provide information as to the size of the table and the particular waiter's station of the table as will be hereinafter more fully described.

Each panel of the seven panels shown in FIG. 3 represents a single dining area, and each of these panels is provided with a signal switch 80 which is utilized for paging the captain of the particular dining area. These captain signal switches are indicated by reference numerals 80, and the details thereof and mode of operation will be hereinafter described. The eighth panel shown in FIG. 3 is at the lower righthand portion of this figure, and includes a clock indicated by reference numeral 82 and three auxiliary signalling switches 83, 84 and 85. Switch 83 is utilized for paging the owner, while switches 84 and 85 are utilized respectively for signalling to all of the rooms or dining areas in the restaurant that the kitchen may be out of ribs or tops respectively, which refer to certain cuts of meat. All of switches 80, 83, 84 and 85 are of the push button latching type, switches 80 and 83 being adapted to produce a flashing light on the remote units while switches 84 and 85 are adapted to produce a steady light on the remote units. Switches 83, 84, and 85 are connected with the remote units in all of the rooms, while switches 80 are connected only with the remote unit of a particular room.

Figure 4:
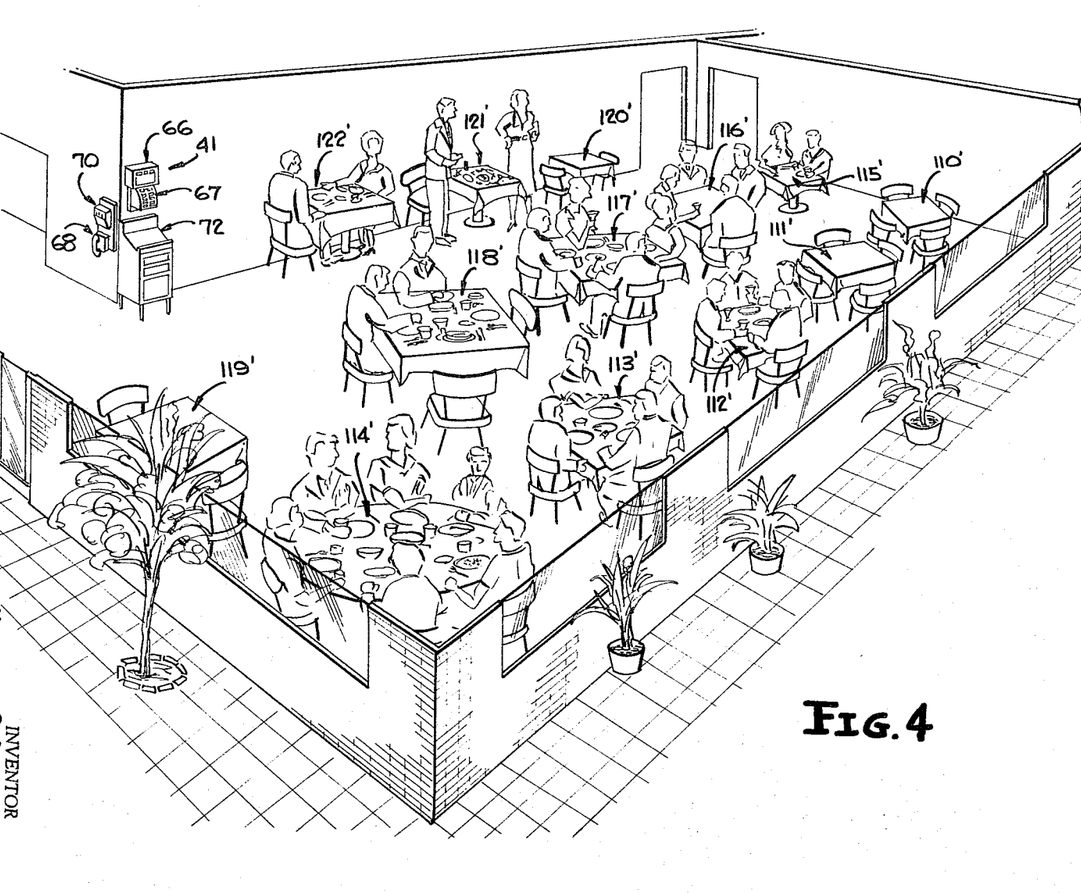
FIG. 4 is a top perspective view illustrating one of the dining areas of the restaurant and illustrating patrons at certain of the tables and with one of the tables being vacated and about to be cleared.

Referring now to FIG. 4, the ROOM #2 dining area is illustrated in a broken-away top perspective view, and in this figure, the various tables within the dining area are indicated in different conditions of occupancy so as to enable the description and understanding of the mode of operation of the system. It will be noted in this figure that a number of the tables are occupied, while some are unoccupied, and the middle table on the far lefthand wall as seen in this figure is just being vacated by a pair of patrons, and is about to be cleared. It will be understood that the room captain will normally be in the vicinity of the remote station 41 and will continually observe the condition of the tables in the room and operate the control switches at the remote unit so as to constantly provide information to the master unit as to the condition of tables.

Figure 5:
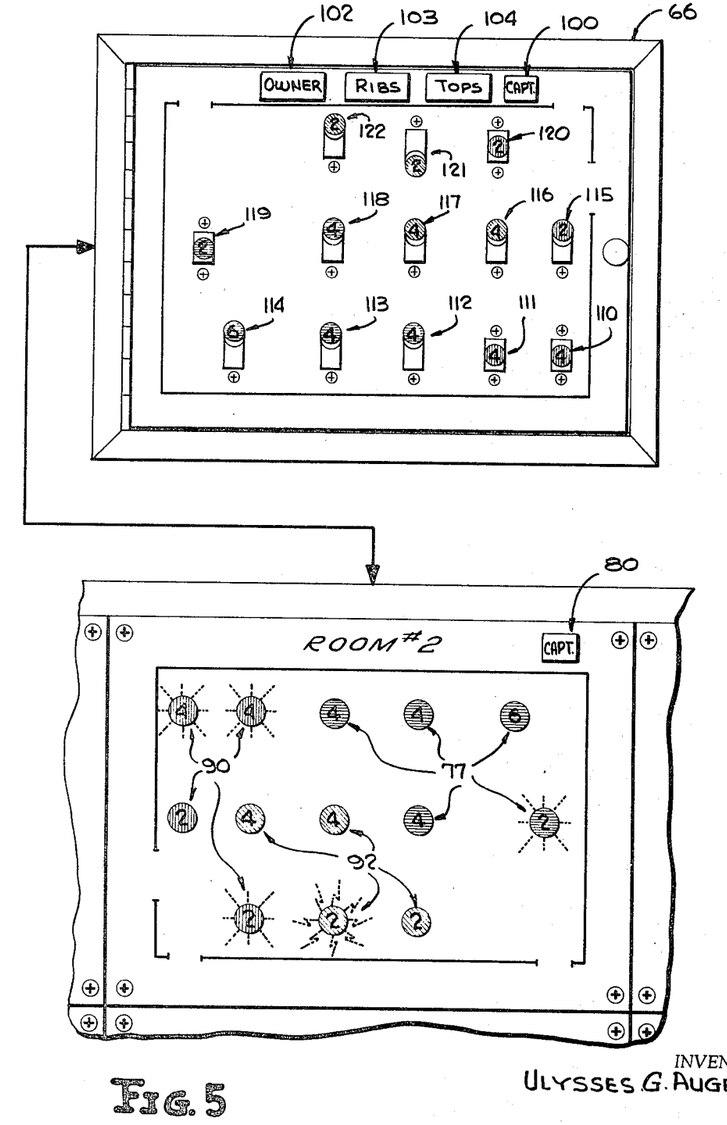
FIG. 5 is a view illustrating in enlarged proportions the details of the panel of the remote station unit at the upper portion of this figure and the corresponding panel of the master station unit illustrating the panels as they will appear when the dining area shown in FIG. 4 is in the condition shown in FIG. 4.

Referring now to FIG. 5 in conjunction with FIG. 4, the position of the control switches on the remote unit and the lighting of the indicator lights at the Room #2 panel of the master unit are shown as they exist at the time when Room #2 is occupied as shown in FIG. 4. As seen especially in the lower portion of FIG. 5, each of the indicator lights 77 is colored a particular distinctive color such as blue to indicate that these five tables in Room #2 comprise the station for one waiter. Additionally, it will be noted that these indicator lights are so constructed as to have translucent cap portions upon which are printed numbers. These numbers indicate the size of the table, or the number of people which the table can accommodate. It is accordingly evident that the indicator light 77 having the number 6 thereon corresponds to the table shown in the lowermost corner of FIG. 4 at which six patrons are illustrated as being seated. This table as well as the three tables for four persons as illustrated in FIG. 5 are all occupied in Room #2 as seen in FIG. 4, and accordingly, these lights are off according to the present invention. When an indicator light is off at the master unit, it indicates that the table is presently occupied. On the other hand, indicator light 77 having a 2 thereon is lit as indicated schematically in FIG. 5 by the dotted lines, and the fact that this light is lit indicates that the table is unoccupied, and reference to FIG. 4 indicates that the table for two indicated by the last-mentioned indicator light 77 is in fact unoccupied and is available.

The four indicator lights 90 as seen in FIG. 5 are all of the same color, such as red, by indicating that these tables comprised the station for a single waiter, the two uppermost lights having numerals 4 thereon indicating that these tables are to be occupied by four patrons, and each of these lights is lit. Reference to FIG. 4 indicates that these two tables in Room #2 are unoccupied, and accordingly, are available. Two of the indicator lights 90 are provided with reference numerals 2, one of these being unlit indicating that it is occupied as illustrated in FIG. 4, while the other indicator light 90 having reference numeral 2 thereon at the lowermost portion of FIG. 5 is lit indicating that it is unoccupied as can be seen in FIG. 4.

Four indicator lights 92 are seen in FIG. 5 which are of the same color such as green to indicate that it is a single waiter station, two of these lights having numerals 4 thereon for indicating that the tables are to be occupied by four patrons, while the other two lights have numerals 2 thereon to indicate that they are tables for two patrons. It will be noted in FIG. 5 that three of the lights 92 are unlit indicating that they are occupied, while the fourth indicator light 92 is flashing as indicated schematically by the jagged broken lines. As seen in FIG. 4, the table indicated by the flashing light 92 of FIG. 5 is just being vacated and is about to be cleared. When the dining area captain observes that the patrons are leaving a particular table and that it is about to be cleared, the control switch is actuated to a position to cause the indicator lights to flash.

Referring now to the upper portion of FIG. 5, the panel of the remote unit is illustrated, and as seen at the upper portion of this panel, a captain signal switch 100 is provided which is operatively connected with the captain switch 80 of the Room #2 panel of the master unit as hereinafter more fully explained. Three auxiliary signal lights 102, 103 and 104 are provided which respectively are adapted to page the owner, to advise that the ribs are out, or to advise that the tops are out, these latter two lights when lit enabling the captain to immediately have the information so that he can advise the waiters and the patrons that these cuts of meat are temporarily out, thereby avoiding the possibility of the patrons' ordering these particular dishes when they are no longer available.

It will be noted that the panel of the remote unit 66 is laid out so as to indicate to the captain the layout of the room, and that the control switches are positioned on the panel in the same relative location as are the tables within the room. For the sake of clarity, the various control switches have been numbered from 110 through 122 inclusive, and the corresponding actual tables in Room #2 have been numbered 110′ through 122′ respectively. It is accordingly apparent that each of the control switches shown in FIG. 5 is provided with a reference numeral which corresponds with the same reference numeral primed for the particular tables illustrated in FIG. 4. The position of the control switches as shown in FIG. 5 is such as to cause the indicator light shown in the lower portion of this figure to be in the particular condition previously described. When the control switch is in its central position, as are control switches 110, 111, 119, and 120, the indicator lights for these particular control switches at the master unit are lit indicating that the tables are empty or vacant. When the control switches are in their up position, as indicated for switches 112, 113, 114, 115, 116, 118 and 122, the corresponding indicator lights at the master unit are unlit thereby indicating that the tables are occupied. On the other hand, when the control switch of the remote unit is in its down position as indicated for control switch 121, the corresponding light on the master unit is in a flashing condition or is intermittently lit to indicate that the table is or is about to be cleared and will become unoccupied and ready for new patrons in the immediate future.

Figure 6:
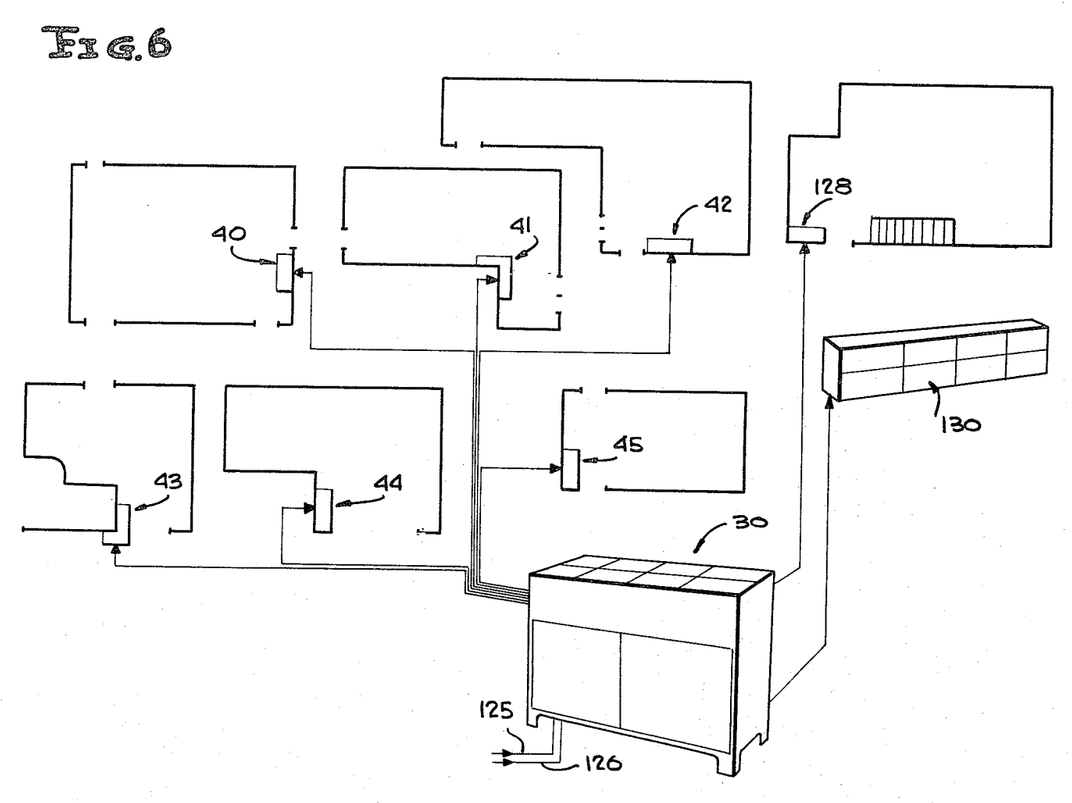
FIG. 6 is a schematic block diagram of the electrical system of the present invention.

Referring now to FIG. 6 of the drawings, a schematic block diagram of the electrical network of the present invention is illustrated. As seen in this figure, a pair of leads 125 and 126 are connected with any suitable source of electrical energy such as a 117 volt alternating current source. The master unit 30 is connected by suitable electrical leads as indicated schematically in FIG. 6 with each of the remote units disposed in different ones of the dining areas. The remote units 40 through 45 inclusive are indicated in this figure, and an additional remote unit 128 is indicated schematically, this remote unit being disposed in ROOM #7 previously referred to which is not illustrated in FIG. 1 of the drawings, but which is on a different level. In addition, the master unit is operatively connected with a similar unit 130 which may have a master control portion identical with the master control portion as shown in FIG. 3 of the drawings.

In other words, unit 130 is connected in parallel with unit 30, and is adapted to be disposed as for example in the owner's office such that the owner may review the operation and occupancy of the tables in the restaurant as desired. It will, of course, be noted that the number of units and dining areas as indicated on the drawings is for the purpose of illustration only, and that other dining areas and units may be added to the network as desired.

Figure 7:
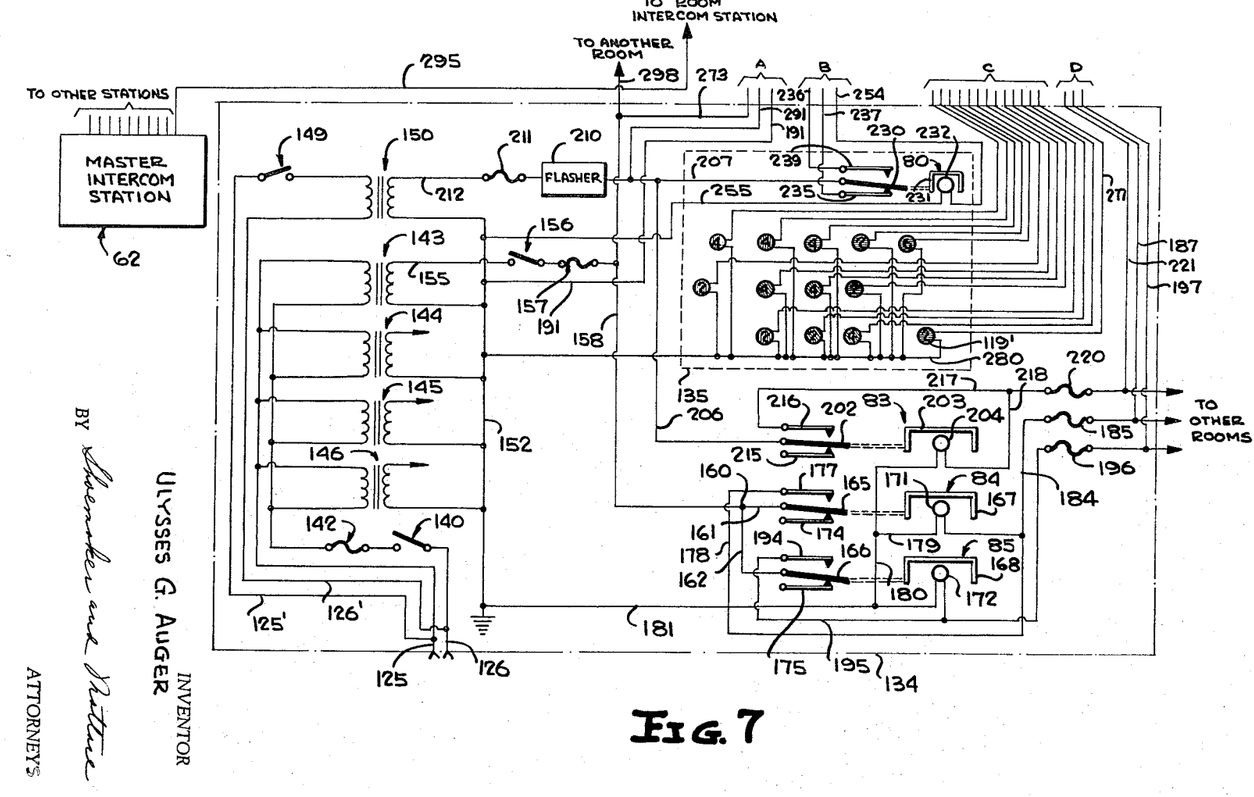
FIGS. 7 and 8 in combination with one another illustrate in a schematic manner the wiring diagram of the master unit and a single remote station unit for the dining area shown in FIG. 4 of the drawing.
Figure 8:
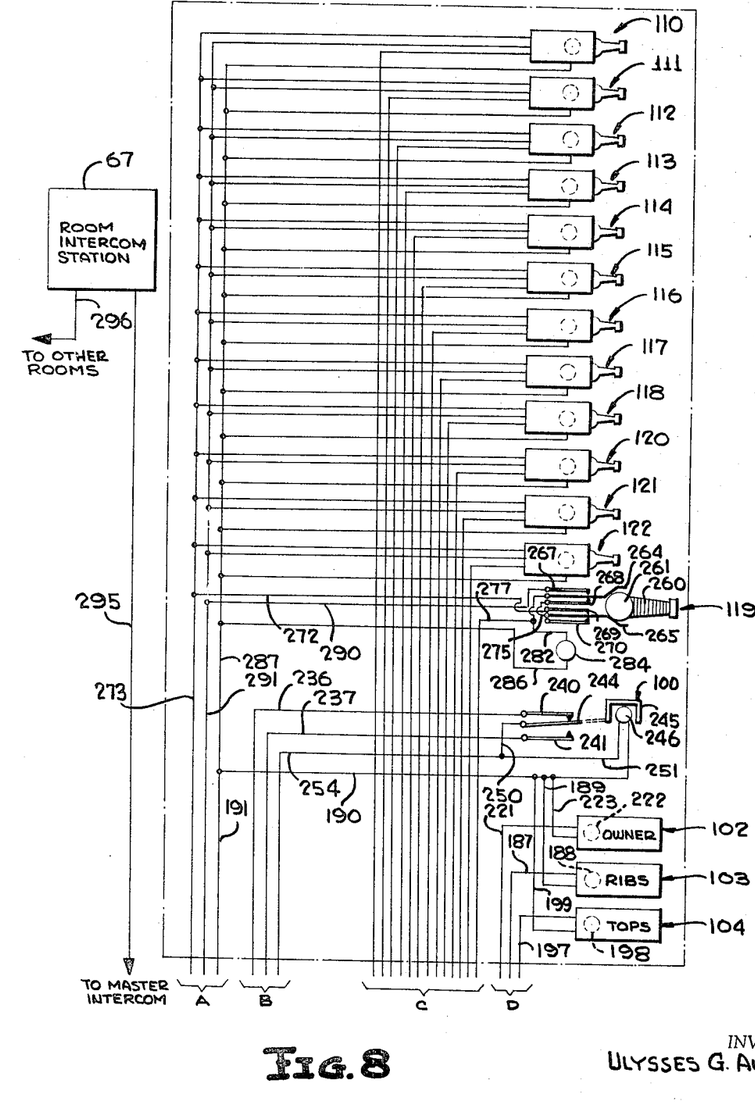

Referring now to FIGS. 7 and 8 of the drawing, a schematic wiring diagram indicates the electrical network for the master unit and one of the remote units, in the illustrated example, the remote unit of ROOM #2 being illustrated. It is apparent that the circuits extending to other rooms will be substantially identical with that disclosed, and that the indicator lights of the master unit will be connected in the circuit in substantially the same manner as illustrated in FIG. 7. In this figure, the portion of the circuit indicated by phantom line 134 represents the electrical network in the master unit for all of the various remote units, while the portion shown in the dotted line 135 represents the portion of the electrical network in the master unit which is specifically provided for one room such as ROOM #2.

As seen particularly in FIG. 7, leads 125 and 126 which are connected with a suitable source of electrical energy are connected through switch 140 and fuse 142 with the primary of transformers 143, 144, 145 and 146. Leads 125' and 126' are connected through a switch 149 with the primary of a transformer 150. The secondaries of all of the aforementioned transformers are in turn connected through a lead 152 to ground. The secondaries of each of transformers 144, 145, and 146 may be connected to various rooms or dining areas in the same manner as is the secondary of transformer 143 which will be hereinafter described.

The secondary of transformer 143 is connected through lead 155 and switch 156 and fuse 157 to a lead 158 which in turn is connected to a point 160. Point 160 is in turn connected tthrough leads 161 and 162 to the movable contact portions 165 and 166 of switches 84 and 85 previously discussed. Movable contact portions 165 and 166 are mechanically interconnected with translucent push button portions 167 and 168, these translucent push button portions having bulbs 171 and 172 disposed therewithin, these bulbs being adapted to be lit under certain circumstances as hereinafter described.

It will be noted as seen in FIG. 7 that the movable contact portions 165 and 166 are disclosed in the latched position such that they engage the fixed contacts 174 and 175 respectively so as to provide an open circuit through the switches. Movable contact 165 is adapted to be moved into the latched position for engaging the fixed contact 177 which is in turn connected with a lead 178. Lead 178 is connected with bulb 171 and by means of leads 179 and 180 and 181 to ground such that when the movable contact 165 engages contact 177, the circuit will be closed through the switch and bulb 171 will be lit. Lead 178 is also connected with lead 184 which has a fuse 185 connected therein. Lead 184 is in turn connected with lead 187 which as seen in FIG. 8 is connected with a bulb 188 in the ribs indicator means 103 at the remote station.

Bulb 188 is also connected through leads 189, 190, and 191 back to lead 152 of FIG. 7 and thence to ground.

Movable contact 166 of switch 85 is adapted to engage the fixed contact member 194 which is connected through a lead 195 and a fuse 196 to a lead 197 which as seen in FIG. 8 is in turn connected with a bulb 198 in the tops indicator means 104 at the remote station. The bulb 198 is in turn connected through lead 199 to lead 190 and thence back to ground.

Switch means 83 as seen in FIG. 7 includes a movable contact portion 202, which is mechanically connected with the translucent push button portion 203 having a bulb 204 mounted therein as indicated schematically in FIG. 7 and as more clearly described hereinafter.

Movable contact 202 of switch means 83 is connected by lead 206 with a lead 207 which in turn is connected with a conventional flasher mechanism 210 which is connected through fuse 211 and lead 212 with the secondary of the transformer 150. Flasher mechanism 210 may be of any conventional construction for providing interrupted current at the output thereof so as to energize the bulbs connected therewith at periodic intervals. Movable conact 202 of switch 83 is illustrated in FIG. 7 as being in a latched position so as to engage the fixed contact 215 of the switch means so as to provide an open circuit. The movable contact is also movable to engage fixed contact 216 of the switch which in turn is connected through leads 217 and 218 with the bulb 204 and thence to ground through leads 180 and 181. Accordingly, when movable contact 202 is moved to engage the fixed contact 216, the circuit will be closed through bulb 204.

Lead 217 is connected through fuse 220 with lead 221 which as seen in FIG. 8 is in turn connected with the bulb 222 in the owner paging indicator means 102, the bulb being connected through lead 223 and leads 190, 191, and 152 to ground.

It is accordingly evident from the foregoing discussion that movement of either of the movable contacts 165 or 166 to engage the contacts 177 and 194 respectively will result in illumination of the bulbs 188 and 198 in indicator means 103 and 104 to provide a continuous illumination of this indicator means. On the other hand, movement of contact 202 of switch 83 to engage contact 216 will result in periodic illumination of the bulb 222 of the owner paging indicator means 102.

As seen in FIG. 7, lead 207 from flasher 210 is connected with the movable contact 230 of the captain switch 80 for ROOM #2. Movable contact 230 is illustrated as being in position for engagement with fixed contact 235 and is movable into engagement in its other latched position with the fixed contact 234. Contacts 234 and 235 are in turn connected with leads 236 and 237 respectively, these leads in turn being connected with the fixed contacts 240 and 241 respectively of the captain switch 100 located at the remote unit. Movable contact 244 is connected with a translucent push button portion 245 having a bulb 246 therewithin.

Movable contact 244 is connected through lead 250 with a lead 251 connected with bulb 246 which is in turn connected with lead 190 and back to ground. Lead 250 is also connected by lead 254 with bulb 232 as seen in FIG. 7, bulb 232 in turn being connected by means of lead 255 with lead 152 and back to ground. It is accordingly apparent that the captain's switches 80 and 100 at the master unit and the remote unit respectively are connected in a conventional lazy man's circuit and are connected with the flasher such that when the lazy man's circuit is closed, the bulbs 232 and 246 of the switches will be periodically energized. Furthermore, operation of this particular circuit can be initiated from either the master station or the remote station.

Considering now the operation of the indicator lights of the master unit for ROOM #2 and the control switches at the remote unit for ROOM #2, it will be observed in FIG. 7 that there are 13 bulbs illustrated within the dotted line 135 corresponding to the 13 bulbs illustrated in FIG. 5 of the drawings. These 13 bulbs are in turn interconnected with the 13 control switches 110 through 122 inclusive previously discussed. Each of the bulbs at the master unit is interconnected with its respective switch at the remote unit in the same manner, all of these circuits being in parallel with one another, and accordingly, the description of one typical interconnected circuit will suffice for all of these circuits which are identical with one another. For the purpose of illustration, one of the bulbs shown in FIG. 7 is identified by reference numeral 119', this bulb being interconnected with the control switch 119 shown in FIG. 8 which is illustrated in enlarged schematic detail, it being understood that all of the remaining control switches above control switch 119 as seen in this figure are of identical construction, the specific structural details of this switch being hereinafter described.

As seen in FIG. 8, control switch 119 includes a pivotally supported handle portion 260 having a roller 261 mounted thereon for engaging a pair of movable contact members 264 and 265 as hereinafter more fully described.

Movable contact 264 is adapted to engage either of the fixed contacts 267 or 268, while movable contact 265 is adapted to engage either of the fixed contacts 269 or 270. In the neutral position of the switch 119 as shown, movable contact 264 is in engagement with the fixed contact 268 while the movable contact 265 is in engagement with the fixed contact 269. Fixed contact 269 is in turn connected by means 272 with a lead 273 which is connected with the output of transformer 143 for providing line current to fixed contact 269. In the position shown in FIG. 8, current will then pass from fixed contact 269 to movable contact 265 and thence through the short lead 275 to the fixed contact 268 and then to movable contact 264, which in turn is connected through lead 277 as seen in FIG. 7 with the bulb 119′, and thence through lead 280 to ground. Movable contact 264 is also connected by lead 282 with a bulb 284 which forms a part of the structure of the control switch, bulb 284 being connected by lead 286 back to lead 191 and thence to ground.

Accordingly, in the position of the switch 119 as shown, the circuit will be completed through the switch to the bulbs 284 and 119′ so that these bulbs will be lit indicating that the table is unoccupied.

When the handle portion 260 of switch 119 is moved upwardly, the roller 261 is pivoted downwardly so as to move the movable contact 265 out of contact with the fixed contact 269 to open the circuit through the switch such that the bulbs 284 and 119′ will be de-energized, the bulbs when unlit indicating that the particular table is occupied.

On the other hand, when the handle portion 260 of the switch is moved downwardly, roller 261 moves upwardly so as to move contact 264 into engagement with contact 267 which is connected by leads 290 and 291 to the flasher mechanism previously described. Accordingly, when the switch is in this position, bulbs 284 and 119′ will be periodically energized to indicate that a table is either being vacated or about to be vacated and cleared.

It will be understood that the interconnection and operation of each of the remaining control switches as seen in FIG. 8 is identical with that discussed in connection with control switch 119, and that each of the bulbs shown within dotted line 135 in FIG. 7 indicating the tables in ROOM #2 may be operated in the same manner to be lit or unlit or flashing as the case may be in accordance with the particular condition of a certain table.

It will also be understood that there is a bulb associated with each of the control switches such that when the control switches are actuated, the bulbs associated with the individual control switches will indicate to the captain who is operating the switches at the remote station whether the lights are lit, unlit or flashing although the captain is also aware of this fact due to the position of the handle portion of the control switches.

It will also be noted that FIGS. 7 and 8 illustrate schematically the interconnection between the master intercom station 62 and the room intercom station 67, a lead 295 illustrating this interconnection. The various room intercom stations may also be interconnected with one another as indicated by lead 296, and, of course, also being understood that the master intercom station provides communication with each of the separate dining areas. As seen in FIG. 7, a lead 298 is indicated as extending to another room so as to provide line current to the remote station unit control switches in a manner similar to lead 273 which serves this function in connection with the control switches of ROOM #2 as previously described. Additionally, it will be apparent that each of the switches 83, 84 and 85 is adapted to be connected in parallel with all of the rooms so as to be common to the various dining areas.

Referring now to FIGS. 9 through 13 inclusive, the structural arrangement of the three position control switch of the present invention is illustrated. This switch is of more or less conventional construction and includes a support frame member 300 which includes a vertically extending forward portion 301 in which the handle portion 260 of the control switch is pivotally mounted. In this description, the switch 119 previously described will be described in detail, it being understood that all the remaining control switches are of identical construction.

Figure 9:
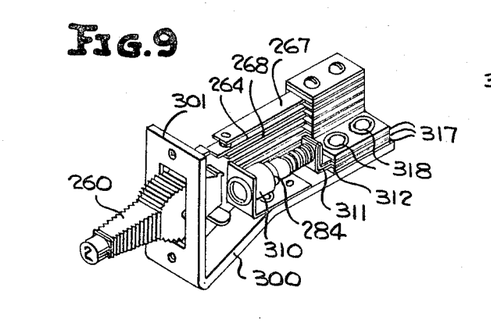
FIG. 9 is a top perspective view of the three position control switch utilized in the present invention.
Figure 10:
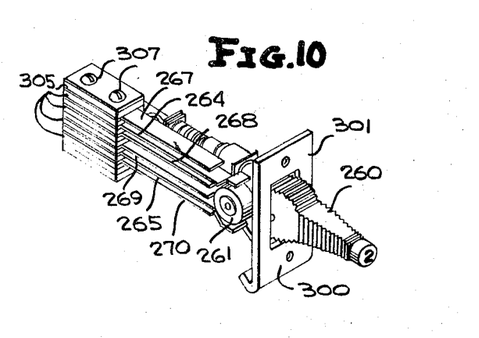
FIG. 10 is a top perspective view of the switch shown in FIG. 9 looking out from a different angle.

The various contacts 267, 264, 268, 259, 265 and 270 all comprise elongated resilient metallic spring-like members, these members being supported in stacked relationship by a plurality of dielectric spacer members 305, the entire assembly being held together by a pair of screws 307 which extend through suitable aligned openings in the contact members and the spacer members, the screws being threaded into suitable openings provided in the support member.

As seen particularly in FIG. 9, a bulb member 284 as previously discussed is protected by a protective bracket 310 secured to the support member 300. Bulb member 284 is connected to a pair of electrically conductive support members 311 and 312 which are insulated from one another and are supported by dielectric spacer members 315, members 311, 312 being connected with the leads 282 and 286 previously discussed. The members 311 and 312 as well as the spacer members 317 are maintained in operative position by means of rivet-like members 318 extending down through suitable openings provided in these members.

Figures 11, 12, 13, 14, 15, 16, 17, 18:
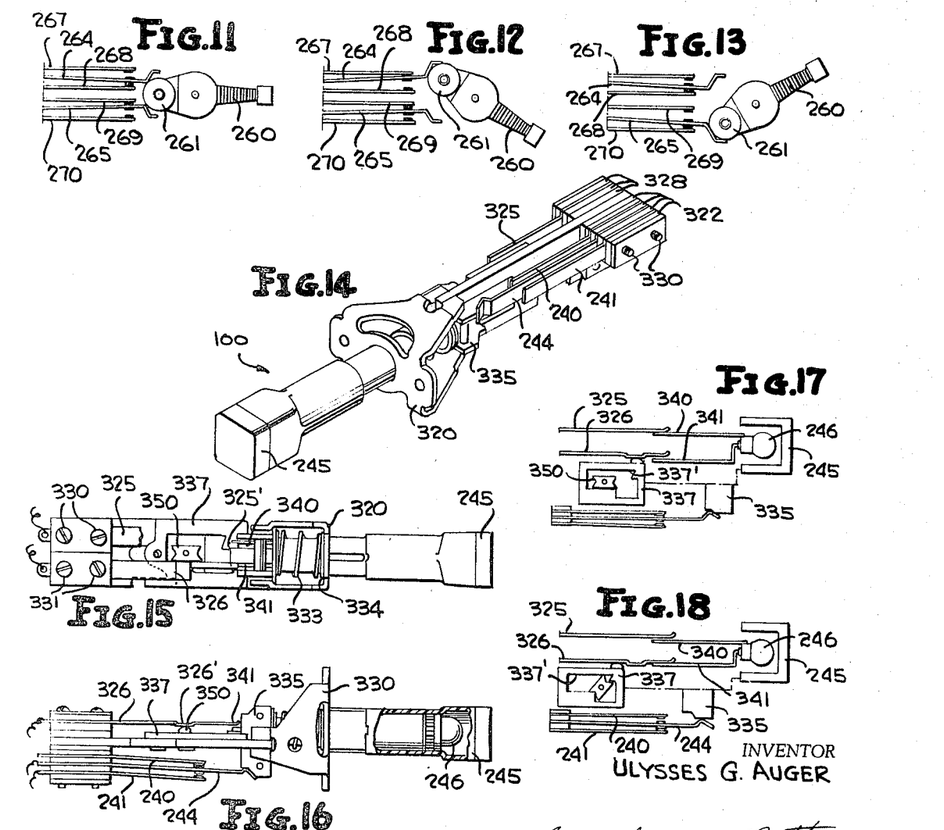
FIGS. 11 through 13 inclusive illustrate the three positions of the switch shown in FIGS. 9 and 10 illustrating the manner in which the contacts are adapted to make and break with respect to one another.
FIG. 14 is a top perspective view of the two position latching switch utilized in the present invention.
FIG. 15 is a side view of the switch shown in FIG. 14 illustrating the opposite side of the switch from that which is visible in FIG. 14.
FIG. 16 is a bottom view of the switch shown in the side view of FIG. 15.
FIGS. 17 and 18 illustrate somewhat schematically the position of certain components of the switch mechanism shown in FIGS. 14 through 16 in the two operative positions thereof, with the latching plate rotated 90° for the purpose of illustration.

FIGS. 11, 12 and 13 show the switch in its three operative positions, it being noted that the movable contacts 264 and 265 are normally biased into engagement with the fixed contacts 268 and 269 respectively.

Referring now to FIGS. 14 through 18 inclusive of the drawings, the details of construction of the latching push button switch means of the present invention is illustrated. Each of the switches 83, 84 and 85 as well as each of the captain's signalling switches 80 and 100 as previously described are of this construction.

For the purpose of illustration, the switch specifically shown in FIGS. 14 through 18 inclusive will be assumed to be the captain's switch 100 at the remote unit as previously discussed.

This switch is of relatively conventional construction and comprises what is known as a latching switch in the art. An elongated support structure 320 is provided, the contacts 240, 241 and 244 comprising elongated leaf spring type members which are supported in a sandwich of dielectric spacers 322. A pair of elongated contacts 325 and 326 are supported by dielectric spacer members 328, all of these various spacer members being retained in operative position by means of screws 330 and 331 which extend through suitable openings provided in the respective members to hold them in place relative to the member 320.

The push button portion 245 is mounted for reciprocation with respect to member 320, a spring 333 being provided for normally biasing the plunger 245 in an outward direction by bearing up against a collar 334 formed on the plunger, the opposite end of the compression spring 333 bearing against a portion of the fixed support means.

The plunger portion of the push button has mounted thereon a camming member 335 and a latching plate 337. The bulb 246 previously described is mounted within the translucent push button portion 245, and a pair of longitudinally extending leads 340 and 341 in the form of electrically conductive rod-like portions extend outwardly of the plunger as seen in FIG. 15, these members 340 and 341 being connected with a bulb. The outer portion of member 340 is adapted to constantly engage the under surface of the outer end 325′ of contact member 325. The member 341 is adapted to engage the under surface of contact member 326 at certain times as hereinafter described.

As seen particularly in FIGS. 16 through 18, lead 326 is provided with a depending portion 326' which is adapted to engage a projection 350 mounted on the latching plate 337. As seen in FIG. 16 and as indicated schematically in FIG. 17, in one position of the latching plate, the projection 350 is adapted to lift contact 326 out of contact with portion 341 so as to open the circuit through the lightbulb, whereas in the other position of the latching plate, the circuit is closed through the lightbulb. This arrangement, of course, may be wired such that when the lazy man's circuit is closed as previously discussed in connection with the captain's signalling switches, the bulb will be energized as previously discussed. It is also apparent that this type of switch may be wired so as to cause energization of the bulb when any of the switches 83, 84 or 85 is closed as previously discussed.

The manner in which the movable contact 244 is moved into and out of engagement with the contacts 240 and 241 may be understood by reference to FIG. 16, wherein it is apparent that the movable contact 244 may be normally biased into contact with contact 240, and upon movement of the push button plunger inwardly, the contact 244 will ride up along the cam member 335 so as to close the connection between contacts 241 and 244 and open the circuit through contact 240, as will be clearly understood. The latter position is illustrated in FIG. 18 of the drawings.

The latching mechanism of the present invention includes the latching plate 337 having an opening formed through the central portion thereof of an unusual shape as illustrated at 337' in the drawings. This opening in the latching plate cooperates with a pivotally mounted latching member 350 which is of substantially rectangular configuration with V-shaped cutouts in the opposite ends thereof. This latching mechanism is of a conventional construction and operates to allow the plunger to move into its outermost position as seen in FIG. 17 or to be latched in its inner position as seen in FIG. 18.

Considering now the use of the present invention, when patrons enter the restaurant and arrive in the entrance area thereof, the maître d' is normally positioned behind the master station unit and has an over-all picture of the availability of tables throughout the restaurant. Those tables which are available will be so indicated by the lighted indicator means on the master unit, and the maître d' can direct patrons immediately back to the particular dining areas where such tables are available.

After the patrons are seated at these tables in the dining areas, the captain of the particular dining area will then move the control switch at the remote station so that the handle portion thereof is up to turn out the lights on the master station unit as well as the remote station unit thereby indicating that the table is unoccupied. As soon as the patrons stand up to leave a table and table is about to be cleared, the captain then moves the handle of the control switch for that particular table downwardly to produce a flashing light for that particular table at the master unit.

When the maître d' observes such a flashing light, he can immediately direct patrons to the dining area such that by the time they arrive, the table will be virtually cleaned off or will already be ready for occupancy.

After the maître d' sends patrons to a particular dining area where a flashing light indicates that a table is being cleared, a translucent plastic cover or the like is placed over the flashing indicator so that the maître d' will be aware of the fact that someone has been already directed back to such table, and, of course, when the captain in the dining area turns the control switch to the position to turn off the light at the master unit for this particular table, the plastic cover can then be removed.

It is, of course, apparent that the various switches for paging the owner or the captain or for advising that ribs or tops may be out may be manipulated from the master unit as required. In addition, the intercom system may be utilized for communicating between the master unit and the various rooms.

It is apparent from the foregoing that there is provided a new and novel method and apparatus for coordinating restaurant operation. The present invention provides maximum efficiency of seating and speed-up of service and will serve to keep a maximum number of tables occupied at all times. The apparatus of the present invention provides an instant visual indication of the condition of tables throughout the entire restaurant both at the master unit as well as in the unit which may be installed in the owner's office.

The present invention enables incoming patrons to be rapidly directed to the various dining areas thereby efficiently dispersing the incoming patrons preventing a traffic jam in this area, and furthermore enabling the utilization of a relatively small lobby or entrance area.

The apparatus provides a complete communication system and signalling system between the master station and the various remote stations. The present invention further reduces the required movement of the maître d' and the captains of the various dining areas to a minimum. The construction of the present invention is such that the apparatus is quite neat and attractive in appearance and is simple and easy to master and use.

The method of the present invention produces maximum efficiency, and yet can be readily carried out even by relatively inexperienced personnel with little training and in a virtually fool-proof manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Apparatus for coordinating restaurant operation comprising, a master station unit adapted to be disposed at a control area in a restaurant, a remote station unit adapted to be disposed at a dining area within the restaurant, the dining area being remote from said control area, means providing communication between said master unit and said remote unit, said master unit having a plurality of separate indicator means, one indicator means being provided for each table within said dining area, said remote station including a plurality of control switches, a control switch being provided for each table within said dining area and each control switch being connected with one of said indicator means of said master unit, each of said control switches being movable to at least three different positions for indicating at least three different conditions of the individual tables in the dining area.

2. Apparatus as defined in claim 1, wherein each of the indicator means of said master unit for a particular dining area is located in the same relative position to the other indicator means as are the tables in the dining area such that a visual indication is provided of the layout of the dining area and a condition of all of the tables in the particular area may be determined at a glance.

3. Apparatus as defined in claim 2, wherein each of said indicator means includes means for indicating the number of patrons which can be accommodated at each particular table.

4. Apparatus as defined in claim 3, wherein each of said indicator means at said master unit also includes means for indicating different waiter stations in each of the dining areas.

5. Apparatus for coordinating restaurant operation comprising a master station unit adapted to be disposed at an entrance control area within the restaurant, a remote station unit adapted to be disposed in a dining area remote from said entrance control area, means providing communication between said master unit and said remote unit, said master unit including a master control portion upon which is laid out the general configuration of the dining area within which said remote unit is positioned, a plurality of indicator means being disposed on said master control portion and indicating the position of each of the tables within said dining area, said indicator means comprising a visual indicating mechanism which is controlled to provide three different types of visual indications for indicating when a particular table is occupied, unoccupied or being cleared, said remote station including an indicator means for each table within the dining area, said last-mentioned indicator means each including a combined control switch and indicator, each of said control switches being connected with one of said indicator means on said master unit for controlling the operation of the indicator means at the master unit, the indicators at said remote unit providing a visual indication of the position of the individual switches and providing a visual indication similar to that provided at the master unit.

6. Apparatus as defined in claim 5, wherein the indicator means at said remote unit are laid out to indicate the position of each of the tables within the dining area, the indicator means at said master unit and said remote unit each indicating both the position and size of the individual tables in order that the proper number of patrons may be directed to the dining area.

7. Apparatus for coordinating restaurant operation comprising a master station unit adapted to be disposed at the entrance area of a restaurant, a remote station unit adapted to be disposed at a dining area remote from said entrance area, means providing communication between said master unit and said remote unit, said master unit including a master control portion having thereon indicating means indicating the relative position of each of the tables within said dining area and also indicating the number of patrons adapted to be accommodated at each of said tables, said indicating means providing a visual indication of the condition of the tables and being adapted to indicate whether the tables are occupied, unoccupied or are being cleared, said remote unit including a plurality of control switches, each of said control switches corresponding to one of the tables in said dining area and being connected with one of said indicator means on said master unit, each of said control switches including a movable portion having three operative positions and being movable into one of said three operative positions for indicating whether a particular table is occupied, unoccupied or is being cleared, each of said control switches having associated therewith an indicator for indicating in a manner similar to the indicator means of the master unit whether the particular table is occupied, unoccupied or is being cleared, said indicating means and said indicators comprising illumination means which are continuously illuminated, continuously non-illuminated, or intermittently illuminated for indicating the three different conditions of the table as set forth above in accordance with the position of said control switches.

8. Apparatus as defined in claim 7, wherein said master unit is provided with selectively operable signal means, said remote unit being provided with a selectively operable signal means connected with the signal means of said master unit, whereby selective signalling can be carried out between the master unit and the remote unit.

9. Apparatus as defined in claim 8, including remote sound communication means for providing sound communication between said master unit and said remote unit.

10. Apparatus for coordinating restaurant operation comprising a master station unit adapted to be disposed at the entrance area of a restaurant, a plurality of remote station units each of which is adapted to be disposed in a separate dining area, said dining areas being disposed at remote locations with respect to said master unit, said master unit including a master control portion upon which is disposed indicating means indicating the layout and position of each of the individual tables in each of the dining areas and a relative location with respect to one another and also indicating the size of each of the tables by designating the number of patrons each table is adapted to accommodate, each of said remote station units including a plurality of control switches corresponding to the number of tables in the particular dining area within which the remote unit is disposed, each of said control switches including indicating means and being connected with a corresponding indicating means of said master unit whereby operation of the control switches at the various remote units is adapted to control operation of the indicating means of the master unit and substantially simultaneous operation of the indicating means of said control switches, each of the control switches including a movable portion having three operative positions and being movable to one of said three positions to control the energization of said indicating means for indicating whether a table is occupied, unoccupied, or is being cleared, and means for signalling and communicating between said master unit and each of said remote units.

11. Apparatus for coordinating restaurant operation comprising a master station unit adapted to be disposed at an entrance control area of a restaurant, a remote station unit adapted to be disposed at a dining area remote from said control area, an electrical network interconnecting said master unit and said remote unit, said electrical network including a source of electrical energy power, a plurality of table indicating lights at said master unit indicating the position of each of the tables within said dining area, a table indicting light at said remote unit for each of said tables in the dining area and corresponding in number to the indicating lights at said master unit for said dining area, control switch means associated with each pair of lights on said master unit and said remote unit corresponding to a particular table, each control switch being connected in series between said source of energy and said lights, said pair of lights for each particular table being connected in parallel with one another, wherein said control switch includes a movable portion having three operative positions, the control switch being open in the first position so as not to cause illumination of either of said indicating lights associated therewith, each control switch being movable to a second position wherein said pair of indicating lights associated therewith are continuously illuminated and each control switch being movable to a third position, flasher means connected in series with said source, said control switch being movable to a third position in series with said flasher means for periodically illuminating said pair of indicating lights connected therewith.

12. Apparatus for coordinating restaurant operation comprising a master station unit adapted to be disposed at an entrance control area of a restaurant, a remote station unit adapted to be disposed at a dining area remote from said control area, an electrical network interconnecting said master unit and said remote unit, said electrical network including a source of electrical energy power, a plurality of table indicating lights at said master unit indicating the position of each of the tables within said dining area, a table indicating light at said remote unit for each of said tables in the dining area and corresponding in number to the indicating lights at said master unit for said dining area, control switch means associated with each pair of lights on said master unit and said remote unit corresponding to a particular table, each control switch being connected in series between said source of energy and said lights, said pair of lights for each particular table being connected in parallel with one another, wherein said control switch is movable to three different positions, the control switch being open in the first position so as not to cause illumination of either of said indicating lights associated therewith, each control switch being movable to a second position wherein said pair of indicating lights associated therewith are continuously illuminated, and each control switch being movable to a third position, flasher means connected in series with said source, said control switch being movable to a third position in series with said flasher means for periodically illuminating said pair of indicating lights connected therewith, and including a signalling switch at said master unit and a corresponding signalling switch at said remote unit, said signalling switch at said master unit being connected in series with said flasher, said signalling switch at said master unit and said signalling switch at said remote unit being electrically interconnected with a lazy man's circuit.

13. Apparatus for coordinating restaurant operation comprising a master station unit adapted to be disposed at the entrance area of a restaurant, a remote station unit adapted to be disposed at a dining area remote from said entrance area, means providing communication between said master unit and said remote unit, said master unit including a master control portion having thereon indicating means indicating the relative position of each of the tables within said dining area and also indicating the number of patrons adapted to be accommodated at each of said tables, said indicating means providing a visual indication of the condition of the tables and being adapted to indicate whether the tables are occupied, unoccupied or are being cleared, said remote unit including a plurality of control switches, each of said control switches corresponding to one of the tables in said dining area and being connected with one of said indicator means on said master unit, each of said control switches including a movable portion having three operative positions and being movable into one of said three operative positions for indicating whether a particular table is occupied, unoccupied or is being cleared, each of said control switches having associated therewith an indicator for indicating in a manner similar to the indicator means of the master unit whether the particular table is occupied, unoccupied or is being cleared, said indicating means and said indicators comprsing illumination means which are continuously illuminated, continuously non-illuminated or intermittently illuminated for indicating the three different conditions of the table as set forth above in accordance with the position of said control switches, said master unit being provided with selectively operable signal means, said remote unit being provided with a selectively operable signal means connected with the signal means of said master unit, whereby selective signalling can be carried out between the master unit and the remote unit, additional signalling means at said master unit and additional signalling means at said remote unit, said additional signalling means at said master unit being selectively operable for operating the additional signalling means at said remote unit, said signalling means comprising illumination means, some of said signalling means being adapted to be continuously illuminated or non-illuminated, and other of said signalling means being adapted to be periodically illuminated or non-illuminated.

14. Apparatus for coordinating restaurant operation comprising a master station unit adapted to be disposed at an entrance control area of a restaurant, a remote station unit adapted to be disposed at a dining area remote from said control area, an electrical network interconnecting said master unit and said remote unit, said electrical network including a source of electrical energy power, a plurality of table indicating lights at said master unit indicating the position of each of the tables within said dining area, a table indicating light at said remote unit for each of said tables in the dining area and corresponding in number to the indicating lights at said master unit for said dining area, control switch means associated with each pair of lights on said master unit and said remote unit corresponding to a particular table, each control switch being connected in series between said source of energy and said lights, said pair of lights for each particular table being connected in parallel with one another, and including a plurality of auxiliary signalling switches at said master unit, a plurality of auxiliary indicator lights at said remote unit, said auxiliary switches being connected in series with said auxiliary indicator lights for signalling from said master unit to said remote unit, at least one of said auxiliary signalling switches being connected in series with the source of electrical energy and the associated auxiliary indicator light, and at least another of said auxiliary switches being connected in series with a flasher connected in series with said source of electrical energy and also in series with the associated auxiliary indicator light.

15. Apparatus for coordinating restaurant operations comprising a master station unit adapted to be disposed at a control area in a restaurant, a plurality of remote station units adapted to be disposed in separate spaced dining areas remote from said control area, said master unit and said remote unit being connected in an electrical network including a source of electrical energy, said master unit including a plurality of indicating lights thereon indicating the position, size and condition of each of the tables in the entire restaurant, each of said remote units having a plurality of indicator lights thereon indicating the position and condition of each of the tables within the associated dining area, a control switch operatively associated with each of the indicator lights on said remote units, the table indicating light at the master unit for a particular table in the restaurant being connected in parallel with the indicating light at the master unit for the same table, each of this pair of lights being connected in series with a particular control switch which controls the operation of the associated pair of lights, each of said control switches being movable into one of three positions, each control switch in a first position opening the circuit through each of the associated pair of lights so that the lights are non-illuminated, each control switch being movable to a second position wherein the pair of indicator lights associated therewith are connected in series with said source for illuminating the lights, a flasher mechanism connected in series with said source and being connected with each of said switch means, each of said switch means being movable into a third position to connect the pair of lights associated therewith in series with said flasher mechanism for causing periodic illumination of the pair of lights for a particular table, a first signalling switch at said master unit and a first signalling switch at each of said remote units, there being a first signalling switch for each of said remote units at said master unit, each of the first signalling switches at said master unit being connected in series with said flasher mechanism and being connected with the first signalling switch of one of said remote units by a lazy man's circuit, a plurality of auxiliary signalling switches disposed at said master unit, a corresponding plurality of signal lights at each of said remote units such that operation of one of the auxiliary signalling switches at said master unit will cause illumination of one of said auxiliary signalling lights at each of said remote units, each of said auxiliary signalling switches at said master unit being connected in series with one auxiliary signalling light at each of said remote units, at least one of said auxiliary signalling switches at said master unit being connected in series with said source, and at least one other of said auxiliary switches at the master unit being connected in series with said flasher mechanism.

16. Apparatus as defined in claim 15, including all communication means for providing oral communication between said master unit and each of said remote units.

References Cited by the Examiner

UNITED STATES PATENTS 998,391   7/1911   Powell _____________ 340—286

(Other references on following page)

UNITED STATES PATENTS

| | | | |
|---|---|---|---|
| 1,327,837 | 1/1920 | Muschenheim et al. | 340—286 |
| 1,340,145 | 5/1920 | Blair et al. | 340—286 |
| 2,171,349 | 8/1939 | Wiley | 340—331 |
| 2,268,240 | 12/1941 | Brixner | 340—332 X |
| 2,375,393 | 5/1945 | Story | 340—225 |
| 2,453,838 | 11/1948 | Fletcher et al. | 340—278 |
| 2,521,225 | 9/1950 | Kearney | 340—332 |
| 2,896,021 | 7/1959 | Philipps | 179—1.4 |
| 2,980,890 | 4/1961 | Staten | 340—286 |
| 3,087,146 | 4/1963 | Boudouris | 340—332 |

FOREIGN PATENTS 360,595  11/1931  England.

NEIL C. READ, *Primary Examiner.*

R. M. GOLDMAN, I. J. LEVIN, *Assistant Examiners.*